United States Patent
Chen

(10) Patent No.: US 9,602,017 B2
(45) Date of Patent: Mar. 21, 2017

(54) SWITCHING POWER SOURCE DEVICE, METHOD OF CONTROLLING SWITCHING POWER SOURCE DEVICE, AND CIRCUIT FOR CONTROLLING SWITCHING POWER SOURCE DEVICE

(71) Applicant: Fuji Electric Co., Ltd., Kanagawa (JP)

(72) Inventor: Jian Chen, Nagano (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days.

(21) Appl. No.: 14/930,540

(22) Filed: Nov. 2, 2015

(65) Prior Publication Data

US 2016/0164425 A1 Jun. 9, 2016

(30) Foreign Application Priority Data

Dec. 3, 2014 (JP) ................................ 2014-244972

(51) Int. Cl.
*H02M 3/337* (2006.01)
*H02M 1/00* (2006.01)
*H02M 3/335* (2006.01)

(52) U.S. Cl.
CPC ..... *H02M 3/33553* (2013.01); *H02M 3/3376* (2013.01); *H02M 2001/0025* (2013.01);
(Continued)

(58) Field of Classification Search
CPC ........... H02M 3/33553; H02M 3/3376; H02M 2001/0025; H02M 2001/0058;
(Continued)

(56) References Cited

U.S. PATENT DOCUMENTS 6,018,467 A * 1/2000 Majid ............... H02M 3/33523
363/16
8,897,036 B2 * 11/2014 Chen ....................... H02M 1/38
363/21.02
(Continued)

FOREIGN PATENT DOCUMENTS

JP 2009-17629 A 1/2009
JP 2013-38857 A 2/2013

OTHER PUBLICATIONS

Received Stic search report from Eic 2800 searcher Benjamin Martin on Sep. 30,2016.*

*Primary Examiner* — Timothy J Dole
*Assistant Examiner* — Htet Z Kyaw
(74) *Attorney, Agent, or Firm* — Chen Yoshimura LLP

(57) ABSTRACT

A switching power source device according to one aspect of the present invention is a current-resonant DC-DC converter, and includes a control integrated circuit having an oscillation circuit that determines a switching frequency of switching elements and a burst control circuit that controls a burst operation in the standby mode, as well as an output voltage detecting unit connected to a secondary side of a transformer to detect an output voltage. The switching frequency of the switching element is determined by the oscillation circuit by the smaller of a first frequency control voltage generated from a voltage of an auxiliary coil disposed in the primary side of the transformer and a second frequency control voltage corresponding to the output voltage, and the burst control circuit generates the first frequency control voltage that gradually increases or decreases in accordance with the voltage of the auxiliary coil.

13 Claims, 5 Drawing Sheets

(52) U.S. Cl.
CPC .............. *H02M 2001/0035* (2013.01); *H02M 2001/0058* (2013.01); *Y02B 70/1433* (2013.01); *Y02B 70/1491* (2013.01); *Y02B 70/16* (2013.01)

(58) Field of Classification Search
CPC ........... H02M 2001/0035; Y02B 70/16; Y02B 70/1433; Y02B 70/1491
USPC ........................................... 363/21.02–21.18
See application file for complete search history.

(56) References Cited

U.S. PATENT DOCUMENTS

| | | | | |
|---|---|---|---|---|
| 9,071,148 B2* | 6/2015 | Hosotani | ........... | H02M 3/33523 |
| 9,318,950 B2* | 4/2016 | Lu | ................ | H02M 1/4225 |
| 9,369,047 B2* | 6/2016 | Tzeng | .............. | H02M 3/33523 |
| 2002/0024269 A1* | 2/2002 | Nakatsuka | ........... | H01L 41/044 |
| | | | | 310/318 |
| 2009/0010027 A1 | 1/2009 | Nishikawa | | |
| 2010/0302815 A1* | 12/2010 | Li | ..................... | H02M 3/33523 |
| | | | | 363/21.09 |
| 2011/0085354 A1* | 4/2011 | Wang | .................. | H02M 1/4225 |
| | | | | 363/21.02 |
| 2011/0194314 A1* | 8/2011 | Morota | ............. | H02M 3/33507 |
| | | | | 363/21.15 |
| 2012/0113689 A1* | 5/2012 | Chen | ................. | H02M 3/33523 |
| | | | | 363/21.17 |
| 2012/0230064 A1* | 9/2012 | Yang | ................. | H02M 3/33523 |
| | | | | 363/21.15 |
| 2012/0250360 A1* | 10/2012 | Orr | ..................... | H02M 3/3376 |
| | | | | 363/21.02 |
| 2013/0128623 A1* | 5/2013 | Hosotani | ........... | H02M 3/33523 |
| | | | | 363/21.01 |
| 2013/0141947 A1* | 6/2013 | Sakurai | ............. | H02M 3/33523 |
| | | | | 363/21.16 |
| 2013/0343101 A1* | 12/2013 | Zhang | ............... | H02M 3/33523 |
| | | | | 363/21.18 |
| 2015/0078040 A1* | 3/2015 | Nishijima | ......... | H02M 3/33523 |
| | | | | 363/21.15 |
| 2016/0065075 A1* | 3/2016 | Sugahara | ............. | H02M 1/4225 |
| | | | | 363/21.02 |
| 2016/0087519 A1* | 3/2016 | Hayakawa | ........ | H02M 3/33523 |
| | | | | 363/21.12 |
| 2016/0141951 A1* | 5/2016 | Mao | ....................... | H02M 1/36 |
| | | | | 363/21.02 |
| 2016/0156271 A1* | 6/2016 | Nishijima | ......... | H02M 3/33523 |
| | | | | 363/21.12 |
| 2016/0172986 A1* | 6/2016 | Hayakawa | ........ | H02M 3/33523 |
| | | | | 363/21.15 |

* cited by examiner

SWITCHING POWER SOURCE DEVICE, METHOD OF CONTROLLING SWITCHING POWER SOURCE DEVICE, AND CIRCUIT FOR CONTROLLING SWITCHING POWER SOURCE DEVICE

BACKGROUND OF THE INVENTION

Technical Field

The present invention relates to a switching power source device, and particularly relates to a switching power source device that is a current-resonant DC-DC converter.

Background Art

Current resonance DC-DC converter switching power source devices can be made highly efficient and thin, and are therefore widely employed in liquid-crystal televisions, AC-DC adapters, and so on. In particular, current-resonant DC-DC converter switching power source devices that aim to reduce power consumed when an electronic device is not in use are being developed to comply with recent initiatives against global warming. Such a switching power source device has a standby mode for suppressing power consumption.

To further reduce the power consumed by the switching power source device when operating in standby mode, Patent Document 1 proposes a current-resonant switching power source device configured to carry out burst operation (a repeating intermittent oscillation operation) in which switching is carried out for a set period and then stopped for the next set period. Burst operation provides a period in which switching is paused, making it possible to greatly reduce the average standby power when the switching power source device is in standby mode. The switching power source device according to Patent Document 1 is furthermore configured to carry out a soft start operation when starting switching during burst operation in standby mode. Here, soft start operation refers to a switching frequency gradually decreasing over time after switching starts and ultimately converging on a given set value. Through the soft start, the resonant current of a resonant circuit gradually increases and the energy supplied from the primary side to the secondary side of a transformer gradually increases as well.

The switching power source device according to Patent Document 1 carries out a soft start when switching starts in the switching operations during burst operation; however, when the switching is stopped, the switching is stopped immediately in a state where the switching frequency is low and a high amount of energy is being supplied from the primary side to the secondary side, which makes it easy for noise to arise. In normal operation outside of the standby mode, the switching frequency does not drop to a frequency band audible to humans, and noise is not emitted from the transformer; however, when switching is stopped while in standby mode, noise corresponding to the resonant current at the stop of switching operations is emitted. In other words, a transient phenomenon arises, where the resonant current drops suddenly when the switching stops suddenly, and this transient phenomenon results in audible noise in the frequency component of the current flowing in the resonant circuit. The greater the resonant current is when the switching operations are stopped, the greater the audible noise frequency component is, resulting in more noise.

To prevent noise, Patent Document 2 proposes, in a switching power source device that performs fixed switching frequency PWM control, carrying out both a soft start and a soft end in the switching period during standby mode burst operation. Here, the soft end operation is an operation that gradually reduces an ON time ratio, which is a ratio of the ON period of a switching element to the switching cycle, as time passes, and reduces the energy sent from the primary side to the transformer. Noise occurring when switching is stopped in burst mode can be prevented by a soft end.

As indicated in FIG. 6 of Patent Document 2, a charge-discharge circuit $601d$ is provided on an output side of a voltage VEN for PWM pulse width control, and a long-period triangular wave is produced by charging/discharging a capacitor CSE connected to the charge-discharge circuit $601d$ with a constant current. In the soft start and soft end, the ON time ratio is gradually increased or reduced by comparing the triangular wave to a carrier signal outputted from an oscillator $6c$. Furthermore, Patent Document 2 discusses achieving the same effects by applying a control circuit 6 that carries out such burst operation in a resonance-type power source.

RELATED ART DOCUMENTS

Patent Documents

Patent Document 1: Japanese Patent Application Laid-Open Publication No. 2013-38857

Patent Document 2: Japanese Patent Application Laid-Open Publication No. 2009-17629

SUMMARY OF THE INVENTION

However, in the switching power source device disclosed in Patent Document 2, the control circuit 6 uses PWM control that changes the ON time ratio with the switching frequency being constant. Accordingly, the control method employed by the control circuit 6 disclosed in Patent Document 2 cannot be applied in a current-resonant DC-DC converter switching power source device that controls output by changing the switching frequency, as described in Patent Document 1.

In addition, no mention is made of a unit for handling an ineffective region, which will be described later.

To solve such problems, it is an object of the present invention to provide a current-resonant DC-DC converter switching power source device, the switching power source device carrying out a soft start and a soft end in a switching period during burst operation and furthermore configured to be capable of handling an ineffective region. Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides switching power source device, including: a transformer having a primary coil, a secondary coil, and an auxiliary coil disposed next to the primary coil on a same side of the primary coil; switching elements connected to the primary coil of the transformer, the switching elements being turned ON and OFF to convert inputted direct current into high-frequency current and supply the high-frequency current to the primary coil of the transformer, thereby generating high-frequency current at the secondary coil of the transformer; a rectifying circuit connected to the secondary coil of the transformer to rectify the high-frequency current generated at the secondary coil; a control circuit controlling the switching elements, the control circuit including an oscillation circuit that sets a switching frequency of the switching elements and a burst control circuit that controls a burst operation in a standby mode; and an output voltage detecting unit measuring an output voltage corresponding to the high frequency current generated at the secondary coil of the transformer, wherein the burst control circuit receives a voltage generated at the auxiliary coil of the transformer and generates, via a charging/discharging unit included in the burst control circuit, a first frequency control voltage based on the voltage of the auxiliary coil, wherein, in the standby mode, the burst control circuit: compares the voltage of the auxiliary coil to a first threshold and, when the voltage of the auxiliary coil is lower than the first threshold, generates the first frequency control voltage that gradually increases, and compares the voltage of the auxiliary coil to a second threshold that is greater than the first threshold and, when the voltage of the auxiliary coil is greater than the second threshold, generates the first frequency control voltage that gradually decreases, and wherein the oscillation circuit receives the first frequency control voltage from the burst control circuit and receives, from the output voltage detecting unit, a second frequency control voltage corresponding to the output voltage, the oscillation circuit setting the switching frequency of the switching elements in accordance with a lower of the first frequency control voltage and the second frequency control voltage.

In addition, a second aspect of the present invention is the switching power source device according to the first aspect, further including a resonant capacitor connected to the primary coil of the transformer, wherein the switching power source device is a current-resonant switching power source device.

In addition, a third aspect of the present invention is the switching power source device according to the first or second aspect, wherein the first frequency control voltage is a charging voltage of a capacitor that is charged and discharged by the charging/discharging unit.

In addition, a fourth aspect of the present invention is the switching power source device according to any one of the first to third aspects, wherein the second frequency control voltage decreases as the output voltage of the secondary coil increases.

In addition, a fifth aspect of the present invention is the switching power source device according to any one of the first to fourth aspects, wherein the switching frequency of the switching elements increases as the lower of the first frequency control voltage and the second frequency control voltage decreases, and becomes 0 upon the lower of the first frequency control voltage and the second frequency control voltage dropping below a prescribed value.

In addition, a sixth aspect of the present invention is the switching power source device according to any one of the first to fifth aspects, wherein a temporal change in the decreasing of the first frequency control voltage is faster than a temporal change in the increasing of the first frequency control voltage.

In addition, in a seventh aspect, the present disclosure provides a method of controlling a switching power source device that includes a transformer having a primary coil, a secondary coil, and an auxiliary coil disposed next to the primary coil on a same side of the primary coil; switching elements connected to the primary coil of the transformer, the switching elements being turned ON and OFF to convert inputted direct current into high-frequency current and supply the high-frequency current to the primary coil of the transformer, thereby generating high-frequency current at the secondary coil of the transformer; and a rectifying circuit connected to the secondary coil of the transformer to rectify the high-frequency current generated at the secondary coil of the transformer, the method including: receiving, by a burst control circuit that controls a burst operation in a standby mode, a voltage generated at the auxiliary coil of the transformer; generating, via a charging/discharging unit included in the burst control circuit, a first frequency control voltage based on the voltage of the auxiliary coil, the burst control circuit comparing the voltage of the auxiliary coil to a first threshold and, when the voltage of the auxiliary coil is lower than the first threshold, generating the first frequency control voltage that is gradually increased, and comparing the voltage of the auxiliary coil to a second threshold that is greater than the first threshold and, when the voltage of the auxiliary coil is greater than the second threshold, generating, via the charging/discharging unit included in the burst control circuit, the first frequency control voltage that is gradually decreased; receiving, by an oscillation circuit connected to the primary coil, the first frequency control voltage from the burst control circuit and receiving, from an output voltage detecting unit, a second frequency control voltage corresponding to an output voltage related to the high-frequency current generated at the second coil of the transformer; and setting, by the oscillation circuit, a switching frequency of the switching elements in accordance with a lower of the first frequency control voltage and the second frequency control voltage.

In addition, an eighth aspect of the present invention is the method of controlling a switching power source device according to the seventh aspect, further including a resonant capacitor connected to the primary coil of the transformer, wherein the switching power source device is a current-resonant switching power source device.

In addition, a ninth aspect of the present invention is the method of controlling a switching power source device according to the seventh or eighth aspect, wherein the first frequency control voltage is a charging voltage of a capacitor that is charged and discharged by the charging/discharging unit.

In addition, a tenth aspect of the present invention is the method of controlling a switching power source device according to any one of the seventh to ninth aspects, wherein the second frequency control voltage decreases as the output voltage of the secondary coil increases.

In addition, an eleventh aspect of the present invention is the method of controlling a switching power source device according to any one of the seventh to tenth aspects, wherein the switching frequency of the switching elements increases as the lower of the first frequency control voltage and the second frequency control voltage decreases, and becomes 0 upon the lower the first frequency control voltage and the second frequency control voltage dropping below a prescribed value.

In addition, a twelfth aspect of the present invention is the method of controlling a switching power source device according to any one of the seventh to eleventh aspects, wherein a temporal change in the decreasing of the first frequency control voltage is faster than a temporal change in the increasing of the first frequency control voltage.

In addition, in a thirteenth aspect, the present disclosure provides a control circuit to be connected to a switching power source device to control the switching power source device, the switching power source device being a current-resonant switching power source device that includes: a transformer having a primary coil, a secondary coil, and an auxiliary coil disposed next to the primary coil on a same side of the primary coil; switching elements connected to the primary coil of the transformer, the switching elements being turned ON and OFF to convert inputted direct current into high-frequency current and supply the high-frequency current to the primary coil of the transformer, thereby generating high-frequency current at the secondary coil of the transformer; and a rectifying circuit connected to the secondary coil of the transformer to rectify the high-frequency current generated at the secondary coil of the transformer, the control circuit including: an oscillation circuit configured to set a switching frequency of the switching elements when the control circuit is connected to the switching power source device; and a burst control circuit configured to control a burst operation in a standby mode when the control circuit is connected to the switching power source device, wherein the burst control circuit is configured to receive a voltage generated at the auxiliary coil of the transformer and generate, via a charging/discharging unit included in the burst control circuit, a first frequency control voltage based on the voltage of the auxiliary coil, wherein, in the standby mode, the burst control circuit is configured to: compare the voltage of the auxiliary coil to a first threshold and, when the voltage of the auxiliary coil is lower than the first threshold, generate the first frequency control voltage that gradually increases, and compare the voltage of the auxiliary coil to a second threshold that is greater than the first threshold and, when the voltage of the auxiliary coil is greater than the second threshold, generate the first frequency control voltage that gradually decreases, and wherein the oscillation circuit is configured to receive the first frequency control voltage from the burst control circuit and receive, from an output voltage detecting unit, a second frequency control voltage corresponding to the output voltage, the oscillation circuit setting the switching frequency of the switching elements in accordance with a lower of the first frequency control voltage and the second frequency control voltage.

In a switching power source device that is a current-resonant DC-DC converter, the efficiency of noise suppression during burst operation in a standby mode can be further improved.

It is to be understood that both the foregoing general description and the following detailed description are exemplary and explanatory, and are intended to provide further explanation of the invention as claimed.

DETAILED DESCRIPTION OF EMBODIMENTS

An embodiment of the present invention will be described hereinafter with reference to the drawings.

(Configuration of Switching Power Source Device)

Figure 1:
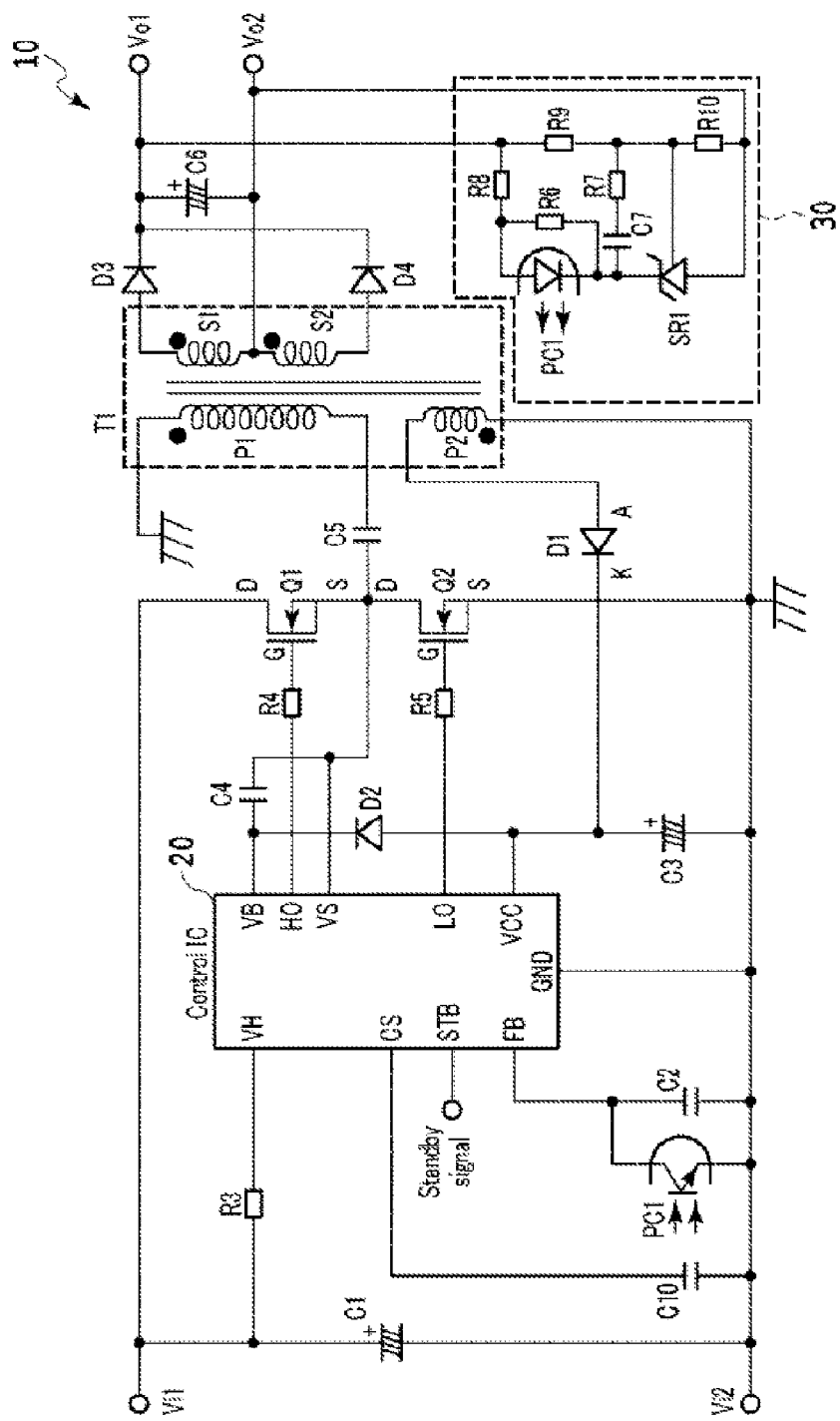
FIG. 1 is a circuit diagram illustrating the configuration of a switching power source device provided with a current-resonant DC-DC converter according to Embodiment 1 of the present invention.

FIG. 1 is a circuit diagram illustrating the configuration of a switching power source device 10 according to Embodiment 1 of the present invention. The switching power source device 10 is a current-resonant DC-DC converter, and is constituted by a power source primary side and a power source secondary side. In the switching power source device 10, a DC current inputted from a power source terminal Vi1 is converted into a high-frequency current through switching and is supplied to a transformer T1. The high-frequency current transmitted to the power source secondary side from the transformer T1 is rectified and smoothed by diodes D3 and D4 and a capacitor C6 on the power source secondary side, and is outputted from an output terminal Vo1 on the power source secondary side as direct current. The switching power source device 10 includes the transformer T1, which is constituted by a primary coil P1, an auxiliary coil P2, a first secondary coil S1, and a second secondary coil S2. The primary coil P1 and the auxiliary coil P2 form a portion of the power source primary side of the switching power source device 10, and the first secondary coil S1 and the second secondary coil S2 form a portion of the power source secondary side of the switching power source device 10.

The power source primary side of the switching power source device 10 includes a switching element Q1 constituted by an N-channel MOSFET whose drain is connected to the power source terminal Vi1 (positive polarity side) and a switching element Q2 constituted by an N-channel MOSFET whose drain is connected to the source of the switching element Q1 and whose source is grounded. In addition, the power source primary side of the switching power source device 10 includes a resonant capacitor C5 connected between one end of the primary coil P1 and a point between the source of the switching element Q1 and the drain of the switching element Q2, and a capacitor C1 connected between the power source terminal Vi1 and a power source terminal Vi2 (negative polarity side). The other end of the primary coil P1 is grounded.

The power source primary side of the switching power source device 10 also includes a control IC 20 that controls an output voltage of the switching power source device 10. The control IC 20 is provided with ten terminals, namely STB, VCC, HO, LO, VB, VS, VH, FB, CS, and GND. A standby signal is inputted into the terminal STB. One end of the auxiliary coil P2 is connected to the terminal VCC via a diode D1. The anode side of the diode D1 is connected to the auxiliary coil P2 and the cathode side to the terminal VCC. The gate of the switching element Q1 is connected to the terminal HO via a resistor R4. The gate of the switching element Q2 is connected to the terminal LO via a resistor R5. The other end of the auxiliary coil P2 is connected to the terminal FB via a capacitor C2 and a photocoupler PC1. The terminal FB is connected to the emitter side of the transistor of the photocoupler PC1, and the auxiliary coil P2 is connected to the collector side. The other end of the auxiliary coil P2 is connected to the terminal CS via a capacitor C10. A connection point between the switching elements Q1 and Q2, and the resonant capacitor C5, are connected to the terminal VB via a capacitor C4. A connection point between the switching elements Q1 and Q2, and the resonant capacitor C5, are connected to the terminal VS. The power source terminal Vi1 is connected to the terminal VH via a resistor R3. A diode D2 is connected between the terminal VB and the terminal VCC, with the cathode thereof connected to the terminal VB side and the anode thereof connected to the terminal VCC side. A capacitor C3 is connected between the terminal VCC and the auxiliary coil P2.

Meanwhile, the power source secondary side of the switching power source device 10 includes a diode D3 whose anode is connected to one end of the first secondary coil S1, and a diode D4 whose anode is connected to one end of the second secondary coil S2 and whose cathode is connected to the cathode of the diode D3. In addition, the power source secondary side of the switching power source device 10 includes the capacitor C6, which is connected between a connection point between the output terminal Vo1 (positive polarity side) and the cathodes of the diodes D3 and D4, and an output terminal Vo2 (negative polarity side).

The power source secondary side of the switching power source device 10 also includes an output voltage detecting unit 30 connected to the output terminals Vo1 and Vo2. The output voltage detecting unit 30 includes a resistor R8 whose one end is connected to the output terminal Vo1, resistors R8 and R9 whose one ends are connected to the output terminal Vo1, an LED of the photocoupler PC1 whose anode is connected to the other end of the resistor R8, and a resistor R7 whose one end is connected to the other end of the resistor R9. The output voltage detecting unit 30 also includes a resistor R6 whose one end is connected to the cathode of the LED of the photocoupler PC1 and whose other end is connected to the anode of the LED of the photocoupler PC1, and a capacitor C7 connected between the cathode of the LED of the photocoupler PC1 and the other end of R7. The output voltage detecting unit 30 also includes a shunt regulator SR1 whose cathode is connected to the cathode of the LED of the photocoupler PC1, whose anode is connected to the output terminal Vo2, and whose reference is connected to the other end of the resistor R9, and a resistor R10 connected between the reference and the anode of the shunt regulator SR1.

Figure 2:
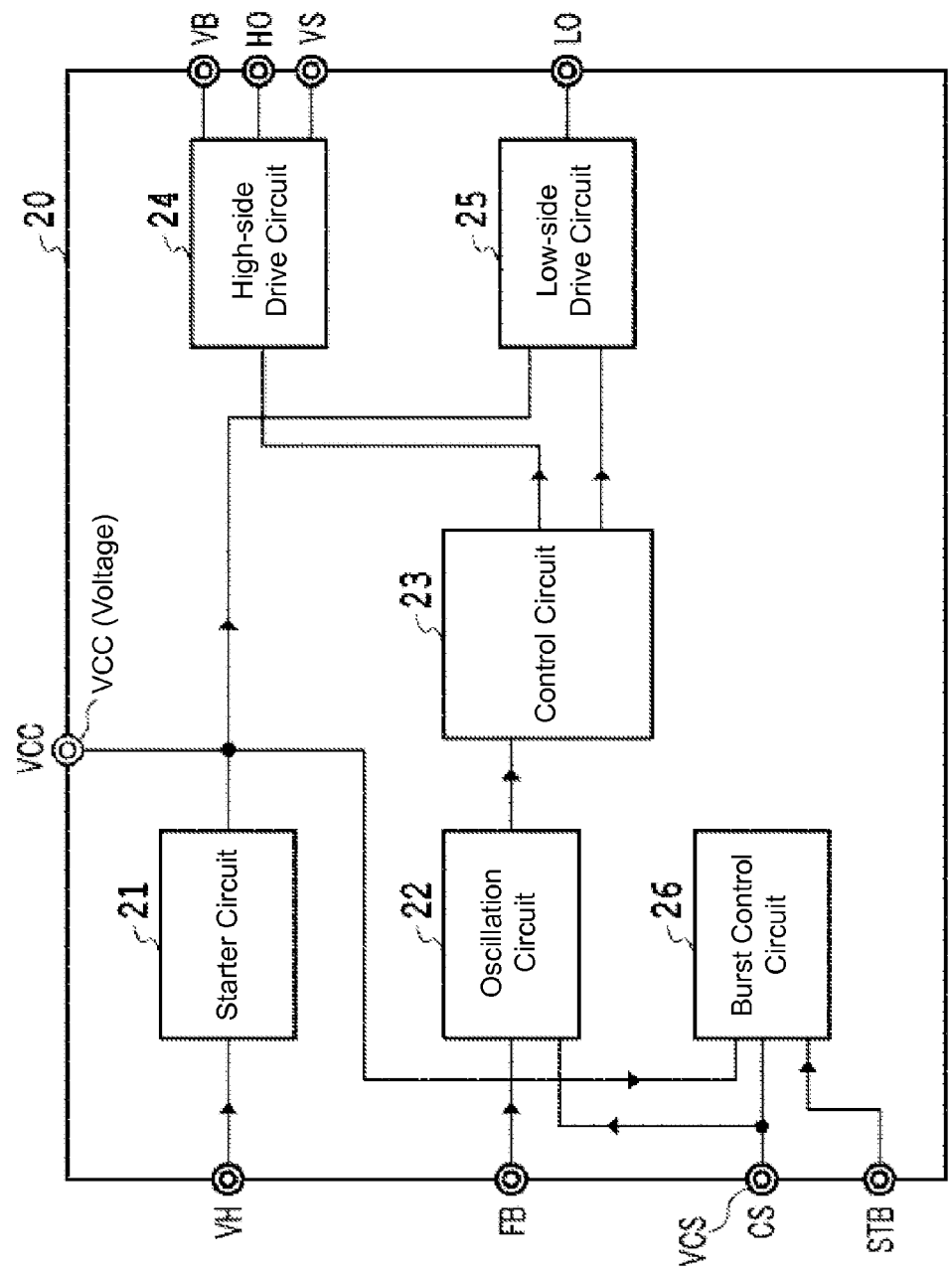
FIG. 2 is a block diagram illustrating the configuration of a control IC of the switching power source device illustrated in FIG. 1.

FIG. 2 is a block diagram illustrating the configuration of the control IC 20 of the switching power source device 10. The control IC 20 includes a starter circuit 21 that takes a voltage from the terminal VH and supplies a starter current to the capacitor C3 via the terminal VCC, an oscillation circuit 22 that receives signals from the terminal FB and the terminal CS, and a control circuit 23 that receives a signal from the oscillation circuit 22. The control IC 20 also includes a high-side drive circuit 24 that receives a signal from the control circuit 23 and outputs a signal to the terminal HO, a low-side drive circuit 25 that receives a signal from the control circuit 23 and sends a signal to the terminal LO, and a burst control circuit 26 that receives signals from the terminals VCC and STB and controls a voltage at the terminal CS by supplying charge/discharge currents to the capacitor C10 via the terminal CS. Note that the capacitor C4 illustrated in FIG. 1 supplies power to high-side circuitry including the high-side drive circuit 24; as such, the terminal VB is a high-side high-potential power source terminal, and the terminal VS is a high-side low-potential power source terminal. The capacitor C4 is charged via the diode D2 when the switching element Q1 is OFF, the switching element Q2 is ON, and a potential at the connection point between the switching elements Q1 and Q2 is at the same potential as the power source terminal Vi2 (negative polarity side). Meanwhile, the capacitor C3 illustrated in FIG. 1 supplies power to low-side circuitry including the low-side drive circuit 25; as such, the terminal VCC is a low-side high-potential power source terminal, and the terminal GND is a low-side low-potential power source terminal.

Figure 3:
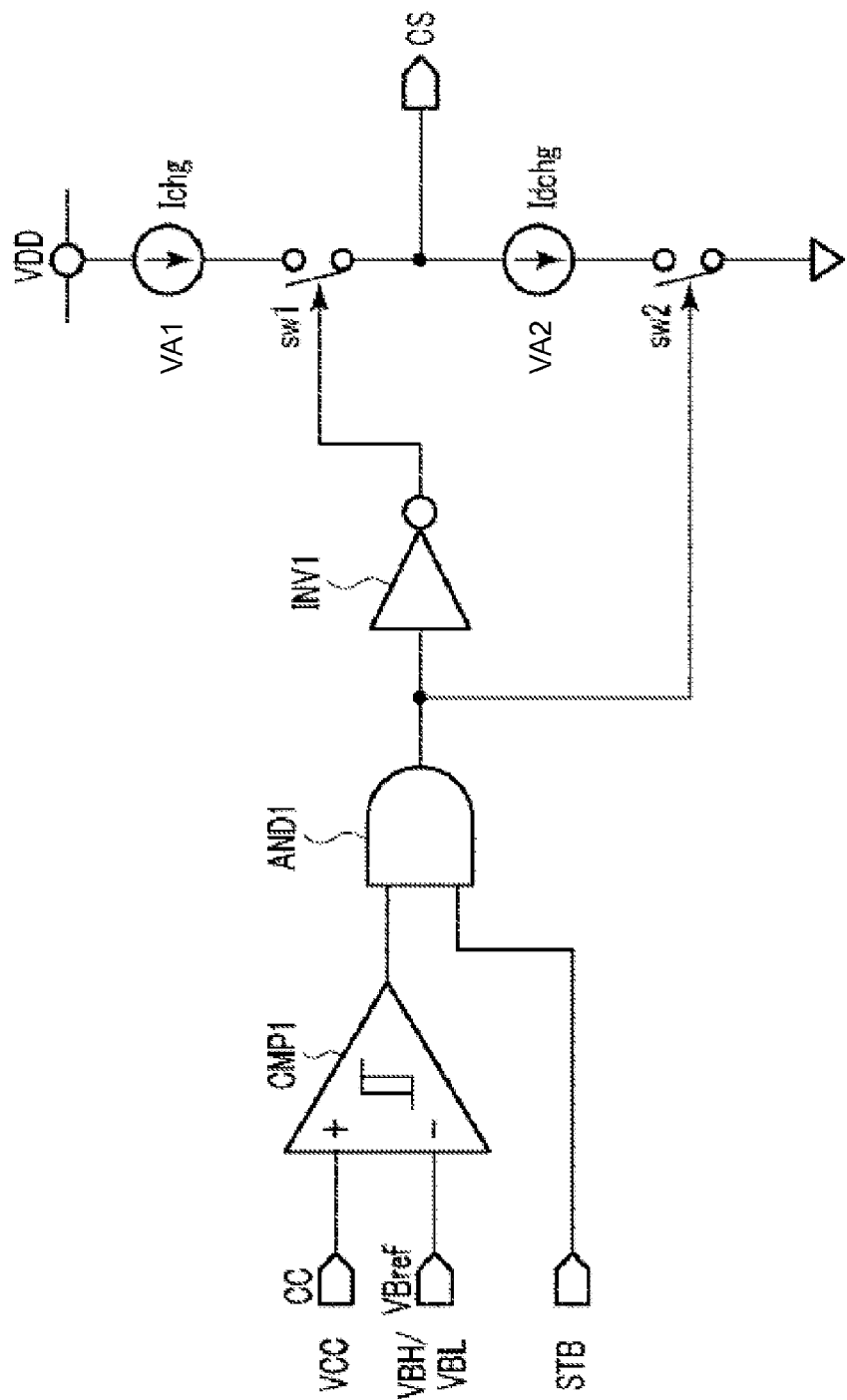
FIG. 3 is a circuit diagram illustrating the configuration of a burst control circuit illustrated in FIG. 2.

FIG. 3 is a circuit diagram illustrating the configuration of the burst control circuit 26 illustrated in FIG. 2. The burst control circuit 26 includes a comparator CMP1 whose non-inverting input terminal is connected to the terminal VCC, whose inverting input terminal is connected to a reference power source VBref, and that has hysteretic characteristics, and a logic circuit AND1 whose gate on one end is connected to the output of CMP1 and whose gate on the other end is connected to the STB terminal. In addition, the burst control circuit 26 includes an inverter INV1 into which is inputted the output of the logic circuit AND1, a switch SW1, constituted by a MOSFET, for example, into (the gate of) which the output of the inverter INV1 is inputted as a control signal and whose drain is connected to the terminal CS, and a switch SW2, constituted by an N-channel MOSFET, for example, into (the gate of) which the output of the logic circuit AND1 is inputted as a control signal, and whose drain is grounded. The switches SW1 and SW2 are ON (conductive) when the control signal is H level and are OFF (cut) when the control signal is L level. The burst control circuit 26 also includes a current source VA1 connected between a power source VDD and the switch SW1, and a current source VA2 connected between the switch SW2 and a connection point between the terminal CS and the switch SW1. Here, a value Ichg of the current source VA1 is a value of a charge current of the capacitor C10 connected to the terminal CS, and a value Idchg of the current source VA2 is a value of a discharge current of the capacitor C10 connected to the terminal CS. The switches SW1 and SW2, the power source VDD, the current sources VA1 and VA2, and a ground terminal form a charging/discharging circuit.

(Switching Power Source Device Operations: Normal Operating Mode)

Operations of the switching power source device 10 will be described next. First, a case where the switching power source device 10 is in a normal operating mode will be described. In the normal operating mode, the switching elements Q1 and Q2 undergo switching control in accordance with the output voltage of the switching power source device 10. In this case, the switching element Q1 and the switching element Q2 turn ON in an alternating manner. Specifically, when the control IC 20 controls the switching element Q1 to turn ON along with controlling the switching element Q2 to turn OFF, controls the switching element Q1 to turn OFF along with controlling the switching element Q2 to turn ON, and so on, a high-frequency current is supplied to the primary coil P1 and a magnetic flux is produced in the primary coil P1. The magnetic flux produced in the primary coil P1 penetrates the auxiliary coil P2, the first secondary coil S1, and the second secondary coil S2. Accordingly, an electromotive force is produced in the auxiliary coil P2, the first secondary coil S1, and the second secondary coil S2. The electromotive force produced in the first secondary coil S1 and the second secondary coil S2 is rectified by the diode D3 and the diode D4, smoothed by the capacitor C6, and is outputted from the output terminal Vo1. The electromotive force produced in the auxiliary coil P2 is rectified by the diode D1 and is supplied to the control IC 20 via the terminal VCC.

Figure 4:
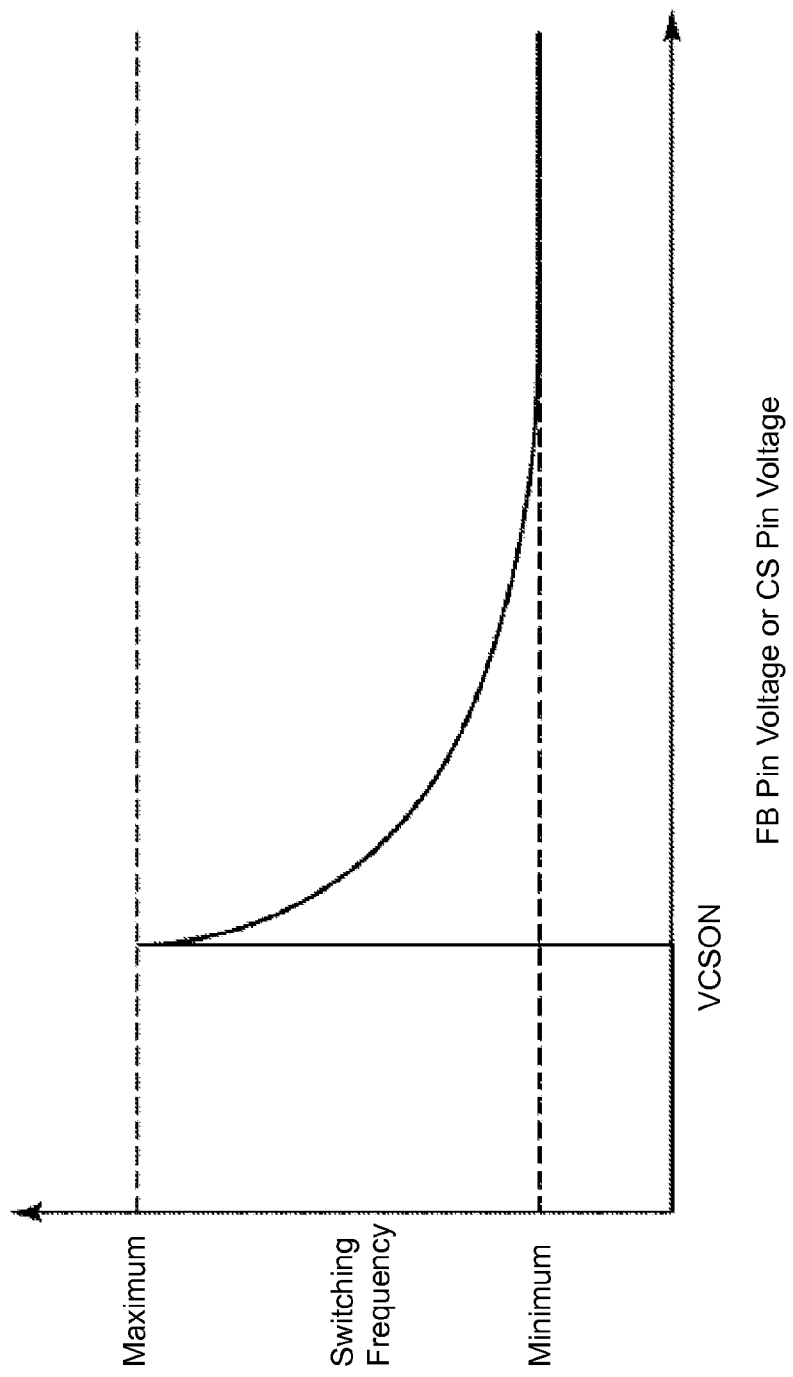
FIG. 4 is a diagram illustrating a relationship between a voltage region of a terminal FB or a voltage region of a terminal CS of the control IC illustrated in FIG. 2 and a switching frequency.

The control circuit 23 of the control IC 20 carries out the ON-OFF switching of the switching element Q1 and the switching element Q2. The control circuit 23 receives a signal, having an ON-OFF switch frequency (a switching frequency), from the oscillation circuit 22. The switching frequency is determined by the oscillation circuit 22, in accordance with whichever value of a voltage VFB at the terminal FB and a voltage VCS at the terminal CS is lower. FIG. 4 is a diagram illustrating a relationship between a voltage region of the voltage VFB or a voltage region of the voltage VCS and the switching frequency. In the case where the voltage VFB at the terminal FB or the voltage VCS at the terminal CS is 0, the switching frequency is 0, but as the voltage increases, the switching frequency reaches a maximum (Maximum in FIG. 4) at a given set value (VCSON), and then falls as the voltage increases, ultimately converging on a set frequency (Minimum in FIG. 4). In a current-resonant DC-DC converter such as that illustrated in FIG. 1, a transmission rate (output voltage/input voltage) is determined by the switching frequency, and in the switching frequency between Minimum and Maximum in FIG. 4, the transmission rate decreases as the switching frequency increases. Here, the voltage VCS (a first frequency control voltage) at the terminal CS in the normal operating mode will be described. The standby signal is inputted to the terminal STB of the burst control circuit illustrated in FIG. 3, but the standby signal is at L level during the normal operating mode. Accordingly, an L level signal is outputted from the logic circuit AND1 regardless of the output of the comparator CMP1. Such being the case, an H level signal is outputted from the inverter INV1, and thus the switch SW1 turns ON and the switch SW2 turns OFF. Accordingly, the capacitor C10 connected to the terminal CS is charged to a potential VDD of the power source VDD and remains fixed at the potential VDD.

The voltage VFB (a second frequency control voltage) at the terminal FB depends on the output voltage of the switching power source device 10. This will be described in detail hereinafter.

The output voltage of the switching power source device 10 is detected by the output voltage detecting unit 30. The output voltage detecting unit 30 increases the current flowing in the photocoupler PC1 as the detected output voltage of the switching power source device 10 increases, and increases the intensity of light emitted from the LED of the photocoupler PC1.

The shunt regulator SR1 of the output voltage detecting unit 30 amplifies an error between an internal reference voltage and a voltage obtained by dividing the output voltage from the output terminal Vo1 using the resistors R9 and R10, and adjusts the current flowing in the photocoupler PC1. The resistor R8 is set to a minimum necessary value for the supplied current by a current limiting resistor of the photocoupler PC1, and the resistor R6 by the shunt regulator SR1. Meanwhile, a feedback constant is set for the resistor R7 and the capacitor C7.

In other words, in the case where the output voltage from the output terminals Vo has dropped below a prescribed voltage determined by the reference voltage of the shunt regulator SR1 and a division ratio of the resistors R9 and R10, the current flowing in the photocoupler PC1 will decrease and the intensity of light emitted from the LED of the photocoupler PC1 will decrease. Meanwhile, in the case where the output voltage from the output terminals Vo has risen above the prescribed voltage determined by the reference voltage of the shunt regulator SR1 and a division ratio of the resistors R9 and R10, the current flowing in the photocoupler PC1 will increase and the intensity of light emitted from the LED of the photocoupler PC1 will increase.

The light emitted from the LED of the photocoupler PC1 is received by a phototransistor of the photocoupler PC1. The amount of current pulled from the terminal FB of the control IC 20 increases as the intensity of light received by the phototransistor of the photocoupler PC1 increases, and a voltage drop caused by that current within the control IC 20 increases, resulting in the voltage VFB (=reference voltage value−the stated voltage drop) decreasing. On the other hand, in the case where the intensity of the received light has decreased, the amount of current pulled from the terminal FB of the control IC 20 decreases, and the voltage drop caused by the current within the control IC 20 decreases, resulting in the voltage VFB increasing. In other words, the voltage VFB of the terminal FB decreases as the output voltage of the switching power source device 10 increases.

The oscillation circuit 22 of the control IC 20 is configured to compare the voltage VFB (the second frequency control voltage) at the terminal FB with the voltage VCS (the first frequency control voltage) at the terminal CS and determine an oscillation frequency in accordance with the smaller of the voltage values (a third frequency control voltage). However, in the normal operating mode, the voltage VFB at the terminal FB will not be higher than the voltage VCS at the terminal CS, which is fixed to the potential VDD of the power source VDD, and thus the oscillation frequency is determined in accordance only with the voltage VFB at the terminal FB. The control IC 20 can control the output voltage to a desired value by controlling the switching of the switching elements Q1 and Q2 in accordance with the voltage at the terminal FB.

In other words, the voltage VFB at the terminal FB decreases when the output voltage rises above the desired value, and the switching frequency increases due to the decrease in the voltage VFB. When the switching frequency increases, the current-resonant DC-DC converter functions so that the output voltage decreases. Meanwhile, the voltage VFB at the terminal FB increases when the output voltage falls below the desired value, and the switching frequency decreases due to the increase in the voltage VFB. When the switching frequency decreases, the current-resonant DC-DC converter functions so that the output voltage increases, thus controlling the output voltage to the desired value.

(Switching Power Source Device Operations: Standby Mode)

Next, operations of the switching power source device 10 during standby mode will be described. In the standby mode, the switching elements Q1 and Q2 are controlled through burst operation. The burst operation in the standby mode repeats, in an alternating manner, a switching period in which the switching element Q1 and the switching element Q2 are turned ON in an alternating manner, and a switching paused period in which both the switching element Q1 and the switching element Q2 are turned OFF and the switching is temporarily stopped.

First, operations of the control IC 20 of the switching power source device 10 during standby mode, and particularly operations in the burst control circuit 26, will be described. In the case of the standby mode, an H level standby signal is inputted into the terminal STB of the burst control circuit 26 illustrated in FIG. 3. On the other hand, a voltage VCC is supplied to the non-inverting input terminal of the comparator CMP1 from the capacitor C3 via the terminal VCC. The voltage VCC at the terminal VCC (the voltage at the terminal VCC is also indicated by VCC) and a reference voltage VBH/VBL (VBH>VBL) of the reference power source VBref connected to the inverting input terminal of the comparator CMP1 are compared. Here, the comparator CMP1 has hysteretic characteristics, and thus an L level signal is outputted until the voltage VCC increases and exceeds VBH, and an H level signal is outputted until the voltage VCC decreases and drops below VBL.

When an H level signal is outputted from the terminal of the comparator CMP1, an H level signal is outputted from the logic circuit AND1. Then, the signal from the logic circuit AND1 is inverted by the inverter INV1, and L level and H level control signals are outputted to the switch SW1 and the switch SW2, respectively, that form part of the charging/discharging circuit of the burst control circuit 26. At this time, the switch SW1 turns OFF and the switch SW2 turns ON. On the other hand, when an L level signal is outputted from the terminal of the comparator CMP1, an L level control signal is outputted from the logic circuit AND1. Then, the signal from the logic circuit AND1 is inverted by the inverter INV1, and H level and L level control signals are outputted to the switch SW1 and the switch SW2, respectively. At this time, the switch SW1 turns ON and the switch SW2 turns OFF.

To summarize: 1. the switch SW1 is ON and the switch SW2 is OFF until the voltage VCC increases and exceeds VBH; 2. when the voltage VCC exceeds VBH, the switch SW1 turns OFF and the switch SW2 turns ON; 3. the switch SW1 stays OFF and the switch SW2 stays ON until the voltage VCC decreases and drops below VBL; and 4. when the voltage VCC drops below VBL, the switch SW1 turns ON and the switch SW2 turns OFF. The stated 1 to 4 are repeated thereafter.

When the switches SW1 and SW2 that form a part of the charging/discharging circuit turn ON and OFF, respectively, the capacitor C10 is charged with a current by the charge current Ichg of the current source VA1, and the voltage VCS gradually increases. Meanwhile, when the switch SW1 turns OFF and SW2 turns ON, the current is discharged from the capacitor C10 by the discharge current Idchg of the current source VA2, and the voltage VCS gradually decreases.

Figure 5:
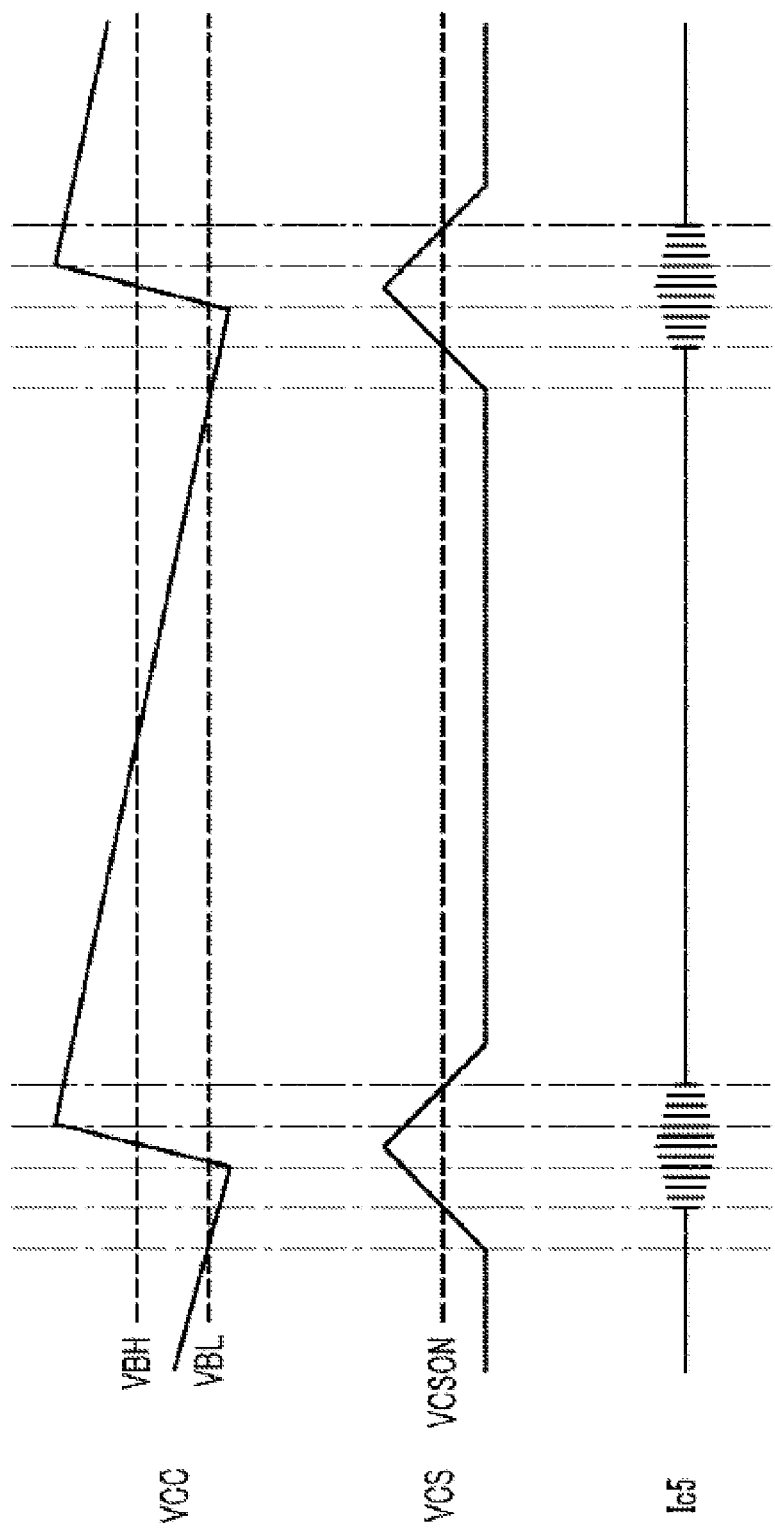
FIG. 5 is a timing chart illustrating a voltage VCC at a terminal VCC and a voltage VCS at a terminal CS of a control IC during a standby mode.

Next, changes in the voltage VCC at the terminal VCC and the voltage VCS at the terminal CS of the control IC 20 during the standby mode will be described. FIG. 5 is a timing chart illustrating the voltage VCC at the terminal VCC and the voltage VCS at the terminal CS of the control IC 20 during the standby mode. Note that Ic5 indicates a resonant current flowing in the resonant capacitor C5.

The various constants of the switching power source device are normally set so that the voltage VFB at the terminal FB is higher than the voltage VCSON by a certain amount during the standby mode. Accordingly, in the standby mode, the voltage VCS at the terminal CS is basically lower than the voltage VFB at the terminal FB, and the switching frequency is determined by the voltage VCS.

First, when power is inputted into the power source terminal Vi1 of the switching power source device 10, a charge current is supplied from the starter circuit to the capacitor C3 connected to the terminal VCC. Then, the voltage VCC, which is also a power source voltage of the control circuit 23, increases, and the switching operations of the switching elements Q1 and Q2 are started. When the switching starts, electromotive force is produced in the auxiliary coil P2, and the charge current is supplied from the auxiliary coil P2 to the capacitor C3 via the terminal VCC as a result. Then, when the voltage VCC at the terminal VCC has increased by a certain amount, and switching can be carried out even without supplying a current from the starter circuit, the supply of the current from the starter circuit is stopped.

The switch SW1 is ON and the switch SW2 is OFF from when the voltage VCC at the terminal VCC is below VBL to when the voltage VCC at the terminal VCC exceeds VBH (the aforementioned point 1 in the summary). As such, the charge current Ichg is accumulated in the capacitor C10. In addition, the voltage VCS at the CS terminal also increases. When VCS increases and exceeds the threshold VSCON, the switching of the switching elements Q1 and Q2 is started (the switching period), and the voltage VCS at the terminal CS continues to rise. As the beginning of the switching period, the energy in the capacitor C3 is consumed and the voltage VCC at the terminal VCC drops due to the switching operations; however, a current is supplied to the capacitor C3 from the auxiliary coil P2 immediately, and thus the voltage VCC at the terminal VCC switches back to increasing.

Next, when the voltage VCC exceeds VBH (the aforementioned point 2 in the summary), the switch SW1 turns OFF and the switch SW2 turns ON. Accordingly, the electric charge accumulated in the capacitor C10 is discharged to ground by the discharge current Idchg. The voltage VCS at the terminal CS gradually decreases, and ultimately becomes 0. Here, the switching of the switching elements Q1 and Q2 is carried out until the voltage VCS decreases and drops below the threshold VSCON.

When the voltage VCS drops below the threshold VSCON, the switching of the switching elements Q1 and Q2 stops and the voltage VCC decreases. The switch SW1 remains OFF, the switch SW2 remains ON, and the voltage VCS does not increase while the voltage VCC is decreasing (the aforementioned point 3 in the summary). Accordingly, the switching of the switching elements Q1 and Q2 is not carried out (the switching paused period).

When the voltage VCC decreases and drops below VBL (the aforementioned point 4 in the summary), the switch SW1 turns ON and the switch SW2 turns OFF again. As such, the charge current Ichg begins to flow into the CS terminal and is accumulated in the capacitor C10. In addition, the voltage VCS at the CS terminal also increases.

When the voltage VCS increases and exceeds the threshold VSCON, the switching of the switching elements Q1 and Q2 is started (the switching period), and the charge current is once again supplied from the auxiliary coil P2 as a result (the aforementioned point 1). The charge current from the auxiliary coil P2 is accumulated in the capacitor C3, and the voltage VCC once again begins to increase.

The oscillation circuit 22 of the control IC 20 compares the voltage VFB at the terminal FB (the second frequency control voltage) with the voltage VCS at the terminal CS (the first frequency control voltage) and determines the oscillation frequency in accordance with the smaller of the voltage values (the third frequency control voltage). Although the voltage VFB is generated under the same principles as in the normal operating mode, the oscillation frequency is basically determined by the voltage VCS in the standby mode, as described above.

In the standby mode, the voltage VCC at the auxiliary coil during the switching paused period does not necessarily correspond to the secondary-side output voltage Vo. This is because the voltage at the auxiliary coil and a load current do not precisely correspond, due to a difference between the capacitance value of the capacitor that accumulates the current from the auxiliary coil and supplies that current to the control circuit and the capacitance value of the capacitor that accumulates a current from the secondary-side coils and supplies that current to a load, a difference between the current consumed by the control circuit and the current consumed by the load, and so on. In such a case, if the oscillation frequency is determined on the basis of the voltage VCS only by referring to the voltage VCC at the auxiliary coil as in Patent Document 2, for example, burst operation based on the output voltage cannot be carried out accurately during the standby mode, and an improvement in the efficiency of the switching power source device cannot be achieved. Accordingly, to carry out more precise control, it is necessary to refer not only to the voltage VCS but also to the voltage VFB, which is the voltage that corresponds to the output voltage, in the burst operation.

The oscillation frequency is specifically determined by the voltage VCS up until the voltage VCS increases and exceeds the voltage VFB. As described above, in the standby mode, the operation range of the voltage VCS is basically set to be lower than the voltage VFB; however, when the power supplied in the burst operation is higher than the power consumed by the load, the output voltage will gradually increase and the voltage VFB will decrease, and the voltage VFB will ultimately enter the operation range of the voltage VCS. When the voltage VCS exceeds the voltage VFB, the oscillation frequency is determined by the voltage VFB, and the switching frequency becomes higher than when the oscillation frequency is determined by the voltage VCS; this results in the transmission rate (output voltage/input voltage) decreasing and an increase in the output voltage being suppressed. When the voltage VCS decreases and drops below the voltage VFB, the oscillation frequency is once again determined by the voltage VCS. By comparing the voltage VFB and the voltage VCS and determining the oscillation frequency by the lower of the voltage values, information of the voltage VFB, which is a voltage corresponding to the output voltage, is taken into consideration when carrying out burst operation in addition to the voltage VCS that depends on information from the voltage VCC at the auxiliary coil P2; as a result, the output voltage can be controlled precisely when in the standby mode.

Here, in the case where the stated third frequency control voltage gradually increases, a soft start is started. For example, in the case where the third frequency control voltage is the voltage VCS, the value of the voltage VCS gradually increases from 0 when the state changes to the aforementioned point 1 or from point 3 to point 4. When the voltage VCS increases and exceeds the threshold VSCON, the switching frequency is produced in the oscillation circuit, and thereafter, the switching frequency gradually decreases as the value of the voltage VCS increases. This makes it possible to carry out a soft start, in which the electromotive force produced in the secondary coil gradually increases.

Meanwhile, in the case where the stated third frequency control voltage gradually decreases, a soft end is started. For example, in the case where the third frequency control voltage is the voltage VCS, the value of the voltage VCS decreases when the state changes from the aforementioned point 1 to 2. As the value of the voltage VCS decreases, the switching frequency in the oscillation circuit gradually increases and reaches a maximum at the threshold VSCON. The switching frequency becomes 0 upon exceeding the threshold VSCON, and the switching stops. Through this, it is possible to carry out a soft end, in which the electromotive force produced in the secondary coil gradually decreases.

In the soft end, there is a region where the output voltage does not increase even if switching is carried out. This region is called an ineffective region. The ineffective region is a region in which the output voltage from the secondary coil, determined by the input voltage and the transmission rate, is lower than the voltage of the capacitor C6, and thus energy is not sent to the capacitor C6, the output terminal, or the like even if switching of the switching element Q1 and the switching element Q2 is carried out. The ineffective region arises due to the voltage VCS decreasing and the switching frequency increasing during a soft end, causing the transmission rate to decrease. The ineffective region is particularly susceptible to being formed when the switching frequency is high, the output voltage at the power source secondary side or the output voltage VCC at the auxiliary coil is high, or when the input voltage is low.

In the switching power source device 10, the load voltage is higher at the time of a soft end than a soft start, as indicated in FIG. 5, and thus the ineffective region arises more easily during a soft start than during a soft end. As such, it is necessary to take measures to reduce the ineffective region during a soft end. In this case, the output voltage VCC at the auxiliary coil can be reduced and the ineffective region can be reduced by increasing the slope of the voltage VCS of the terminal CS during the soft end. This is because increasing the slope of the voltage VCS makes it possible to shorten the period from when the voltage VCS begins to decrease to when the switching stops (the period in which the ineffective region arises). Specifically, if Idchg>Ichg, the slope of the voltage VCS during a soft end can be increased.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A switching power source device, comprising:
 a transformer having a primary coil, a secondary coil, and an auxiliary coil disposed next to the primary coil on a same side of the primary coil;
 switching elements connected to the primary coil of the transformer, the switching elements being turned ON and OFF to convert inputted direct current into high-frequency current and supply said high-frequency current to the primary coil of the transformer, thereby generating high-frequency current at the secondary coil of the transformer;
 a rectifying circuit connected to the secondary coil of the transformer to rectify the high-frequency current generated at the secondary coil;
 a control circuit controlling said switching elements, the control circuit including an oscillation circuit that sets a switching frequency of said switching elements and a burst control circuit that controls a burst operation in a standby mode; and
 an output voltage detecting unit measuring an output voltage corresponding to the high frequency current generated at the secondary coil of the transformer,
 wherein said burst control circuit receives a voltage generated at the auxiliary coil of said transformer and generates, via a charging/discharging unit included in the burst control circuit, a first frequency control voltage based on the voltage of the auxiliary coil,
wherein, in said standby mode, the burst control circuit:
compares said voltage of said auxiliary coil to a first threshold and, when the voltage of said auxiliary coil is lower than said first threshold, generates the first frequency control voltage that gradually increases, and
compares the voltage of said auxiliary coil to a second threshold that is greater than the first threshold and, when the voltage of said auxiliary coil is greater than said second threshold, generates said first frequency control voltage that gradually decreases, and
wherein said oscillation circuit receives said first frequency control voltage from said burst control circuit and receives, from the output voltage detecting unit, a second frequency control voltage corresponding to said output voltage, said oscillation circuit setting the switching frequency of said switching elements in accordance with a lower of said first frequency control voltage and said second frequency control voltage.

2. The switching power source device according to claim 1, further comprising:
a resonant capacitor connected to said primary coil of said transformer,
wherein said switching power source device is a current-resonant switching power source device.

3. The switching power source device according to claim 1, wherein said first frequency control voltage is a charging voltage of a capacitor that is charged and discharged by said charging/discharging unit.

4. The switching power source device according to claim 1, wherein said second frequency control voltage decreases as the output voltage of said secondary coil increases.

5. The switching power source device according to claim 1, wherein the switching frequency of said switching elements increases as said lower of said first frequency control voltage and said second frequency control voltage decreases, and becomes 0 upon said lower of said first frequency control voltage and said second frequency control voltage dropping below a prescribed value.

6. The switching power source device according to claim 1, wherein a temporal change in the decreasing of said first frequency control voltage is faster than a temporal change in the increasing of said first frequency control voltage.

7. A method of controlling a switching power source device that includes a transformer having a primary coil, a secondary coil, and an auxiliary coil disposed next to the primary coil on a same side of the primary coil; switching elements connected to the primary coil of the transformer, the switching elements being turned ON and OFF to convert inputted direct current into high-frequency current and supply said high-frequency current to the primary coil of the transformer, thereby generating high-frequency current at the secondary coil of the transformer; and a rectifying circuit connected to the secondary coil of the transformer to rectify the high-frequency current generated at the secondary coil of the transformer, the method comprising:
receiving, by a burst control circuit that controls a burst operation in a standby mode, a voltage generated at the auxiliary coil of said transformer;
generating, via a charging/discharging unit included in the burst control circuit, a first frequency control voltage based on the voltage of said auxiliary coil, said burst control circuit comparing said voltage of said auxiliary coil to a first threshold and, when the voltage of said auxiliary coil is lower than said first threshold, generating said first frequency control voltage that is gradually increased, and comparing the voltage of said auxiliary coil to a second threshold that is greater than the first threshold and, when the voltage of said auxiliary coil is greater than said second threshold, generating, via the charging/discharging unit included in said burst control circuit, said first frequency control voltage that is gradually decreased;
receiving, by an oscillation circuit connected to said primary coil, said first frequency control voltage from said burst control circuit and receiving, from an output voltage detecting unit, a second frequency control voltage corresponding to an output voltage related to the high-frequency current generated at the second coil of the transformer; and
setting, by said oscillation circuit, a switching frequency of said switching elements in accordance with a lower of said first frequency control voltage and said second frequency control voltage.

8. The method of controlling a switching power source device according to claim 7, further comprising:
a resonant capacitor connected to said primary coil of said transformer,
wherein said switching power source device is a current-resonant switching power source device.

9. The method of controlling a switching power source device according to claim 7, wherein said first frequency control voltage is a charging voltage of a capacitor that is charged and discharged by said charging/discharging unit.

10. The method of controlling a switching power source device according to claim 7, wherein said second frequency control voltage decreases as the output voltage of said secondary coil increases.

11. The method of controlling a switching power source device according to claim 7, wherein the switching frequency of said switching elements increases as said lower of said first frequency control voltage and said second frequency control voltage decreases, and becomes 0 upon said lower said first frequency control voltage and said second frequency control voltage dropping below a prescribed value.

12. The method of controlling a switching power source device according to claim 7, wherein a temporal change in the decreasing of said first frequency control voltage is faster than a temporal change in the increasing of said first frequency control voltage.

13. A control circuit to be connected to a switching power source device to control said switching power source device, said switching power source device being a current-resonant switching power source device that includes: a transformer having a primary coil, a secondary coil, and an auxiliary coil disposed next to the primary coil on a same side of the primary coil; switching elements connected to the primary coil of the transformer, the switching elements being turned ON and OFF to convert inputted direct current into high-frequency current and supply said high-frequency current to the primary coil of the transformer, thereby generating high-frequency current at the secondary coil of the transformer; and a rectifying circuit connected to the secondary coil of the transformer to rectify the high-frequency current generated at the secondary coil of the transformer, the control circuit comprising:
an oscillation circuit configured to set a switching frequency of said switching elements when the control circuit is connected to the switching power source device; and a burst control circuit configured to control a burst operation in a standby mode when the control circuit is connected to the switching power source device, wherein said burst control circuit is configured to receive a voltage generated at the auxiliary coil of said transformer and generate, via a charging/discharging unit included in the burst control circuit, a first frequency control voltage based on the voltage of the auxiliary coil, wherein, in said standby mode, the burst control circuit is configured to:

compare said voltage of said auxiliary coil to a first threshold and, when the voltage of said auxiliary coil is lower than said first threshold, generate the first frequency control voltage that gradually increases, and compare the voltage of said auxiliary coil to a second threshold that is greater than the first threshold and, when the voltage of said auxiliary coil is greater than said second threshold, generate the first frequency control voltage that gradually decreases, and wherein said oscillation circuit is configured to receive said first frequency control voltage from said burst control circuit and receive, from an output voltage detecting unit, a second frequency control voltage corresponding to said output voltage, said oscillation circuit setting the switching frequency of said switching elements in accordance with a lower of said first frequency control voltage and said second frequency control voltage.

* * * * *

UNITED STATES PATENT AND TRADEMARK OFFICE
CERTIFICATE OF CORRECTION

PATENT NO. : 9,602,017 B2
APPLICATION NO. : 14/930540
DATED : March 21, 2017
INVENTOR(S) : Jian Chen It is certified that error appears in the above-identified patent and that said Letters Patent is hereby corrected as shown below:

In the Specification

Column 14, Line 29, Formula "Idchg > Ichg" should be changed to --Idchg $\geq$ Ichg--.

Signed and Sealed this
Sixteenth Day of May, 2017

Michelle K. Lee
*Director of the United States Patent and Trademark Office*